(12) United States Patent
Park et al.

(10) Patent No.: US 7,200,224 B2
(45) Date of Patent: Apr. 3, 2007

(54) HINGE DEVICE FOR PORTABLE WIRELESS TERMINAL

(75) Inventors: Sung-Sun Park, Kumi-shi (KR); Jong-Gun Bae, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 10/341,361

(22) Filed: Jan. 14, 2003

(65) Prior Publication Data

US 2004/0091101 A1    May 13, 2004

(30) Foreign Application Priority Data

Nov. 12, 2002   (KR)   ................... 10-2002-0070018

(51) Int. Cl.
*H04M 1/00*   (2006.01)
*H04M 9/00*   (2006.01)

(52) U.S. Cl. ................. 379/433.13; 379/428.01; 379/428.02; 455/575.1

(58) Field of Classification Search ........... 379/428.01, 379/428.02, 428.03, 433.13
See application file for complete search history.

(56) References Cited

U.S. PATENT DOCUMENTS 5,704,094 A * 1/1998 Hartigan et al. ............. 16/303
6,085,387 A * 7/2000 Han ............................. 16/330
6,091,600 A * 7/2000 Jeong .......................... 361/680
6,292,980 B1   9/2001 Yi et al.
6,445,577 B1 * 9/2002 Madsen et al. ............. 361/683

FOREIGN PATENT DOCUMENTS

WO   WO 02/082674   10/2002

* cited by examiner

*Primary Examiner*—Wing Chan
*Assistant Examiner*—Aamir Haq
(74) *Attorney, Agent, or Firm*—Roylance, Abrams, Berdo & Goodman, L.L.P.

(57) ABSTRACT

A hinge device for a portable wireless terminal with a first housing and a second housing being rotatably connected to the first housing is provided, comprising a double hinge arm rotatably connected respectively to the first and second housings and a pair of hinge modules for stopping the rotation of the double hinge arm at various angles. The hinge device includes a pair of rotary axes, allowing one selected housing to be rotated about the other housing by 360°. A portable wireless terminal employing the hinge device can accommodate various units such as a display device, an inputting unit, among others, and the functions of the terminal are easily modified and extended. Furthermore, various information terminals are easily integrated as a single portable wireless terminal. Moreover, since a user can open or close the terminal at various angles, a portable wireless terminal employing the hinges is convenient to use.

20 Claims, 9 Drawing Sheets

HINGE DEVICE FOR PORTABLE WIRELESS TERMINAL

This application claims priority to an application entitled "HINGE DEVICE FOR PORTABLE WIRELESS TERMINAL", filed in the Korean Industrial Property Office on Nov. 12, 2002 and assigned Serial No. 2002-70018, the contents of which are hereby incorporated by reference.

BACKGROUND OF THE INVENTION

1. Field of the Invention

The present invention relates to a hinge device for a portable wireless terminal, and more particularly, to a hinge device for a portable wireless terminal such as a cellular phone or PDA (Personal Digital Assistant), and other similar devices.

2. Description of the Related Art

Conventional portable wireless terminals can be categorized according to their shape. For example, there are bar-type terminals, flip-type terminals, and folder-type terminals.

The bar-type mobile telephone terminal comprises a main housing, data inputs and outputs and transmitting and receiving modules installed on the main housing. In this case, since a keypad serving as data input means is always exposed to the outside, the keypad may be easily damaged, causing it to malfunction. Further, this type of terminal has a limit in its miniaturization due to the lengthy distance between the transmitting and receiving units.

The flip-type mobile telephone terminal comprises a main housing, a flip, and a hinge device for connecting the flip to the main housing. Data input and output devices and transmitting and receiving modules are installed on the main housing. In the flip-top terminal, the flip covers the main housing so as to protect a keypad serving as the data input means installed on the main body, thereby preventing damage to the keypad. However, the flip-type terminal still has a limit in its miniaturization due to the lengthy distance between the transmitting and receiving units.

The folder-type terminal comprises a main housing, a folder, and a hinge unit for rotatably connecting the folder to the main housing. The folder-type terminal is thereby opened and closed by the rotation of the folder. When a device utilizing the folder-type terminal housing is in standby mode, the folder is closed into the main housing of the folder-type terminal, to prevent damage to the keypad. When the device is in communications mode, the folder is opened from the main housing of the folder-type terminal, and a sufficient distance between the transmitting unit and the receiving unit is assured. Thus, the folder-type terminal has an advantage in terms of its miniaturization. As a result, portable wireless terminals have been mainly developed using the folder-type terminals.

In the flip-type or folder-type terminal, when the flip or the folder is rotated about the main housing more than a designated angle by the hinge device for rotatably connecting the flip or the folder to the main housing, force is applied to the hinge device so as to act in the direction of opening the flip or the folder from the main housing. Conversely, when the flip or the folder is rotated about the main housing less than the designated angle by the hinge device, force is applied to the hinge device so as to act in the direction of closing the flip or the folder into the main housing. Therefore, the flip or the folder is opened from, and closed into the main housing, even by a small amount of force.

The aforementioned hinge device is disclosed in detail by U.S. Pat. No. 6,292,980, issued to Yi et. al on Sep. 25, 2001, the entire contents of which are expressly incorporated herein by reference. The disclosed hinge device comprises a hinge cam and a hinge shaft which include mountain-shaped portions and valley-shaped portions respectively, and a hinge spring provided in a hinge housing to urge the hinge cam toward the hinge shaft. In this case, the folder or the flip is opened from and closed into the main body by curved surfaces of the mountain-shaped and valley-shaped portions and the elastic force of the hinge spring.

As mobile communication services have been recently diversified, the number of functions the terminal serves has correspondingly increased. For example, the terminal now serves as a portable terminal, a PDA, and a personal computer, which, along with other functions, are integrated in a single terminal. However, the conventional hinge device has only one function, namely rotatably opening and closing the flip or folder of the portable wireless terminal from and into the main body in the range of a designated angle. Thus, there are many limits in modifying the specification of the terminal in order to perform various mobile communication services. As a result, the conventional portable wireless terminal and hinge device do not satisfy the aforementioned various mobile communication services and customers' desires.

SUMMARY OF THE INVENTION

An object of the present invention is to substantially solve at least the above problems and/or disadvantages and to provide at least the advantages described below. Accordingly, an object of the present invention is to provide a hinge device for a portable wireless terminal with a pair of housings in which a selected housing is connected to the other housing so as to be rotate about the other housing by about 360°.

It is another object of the present invention to provide a hinge device for a portable wireless terminal with a pair of housings in which a selected housing is connected to the other housing so as to stop its rotation at various angles with the other housing.

In accordance with one aspect of the present invention, the above and other objects can be substantially accomplished by a hinge device of a portable wireless terminal provided with a first housing and a second housing that is rotatably connected to the first housing. The hinge device comprises a double hinge arm, extending in the longitudinal direction of the first and second housings and being rotatably connected to one side of each of the first and second housings, a pair of hinge holes formed through one end of the double hinge arm, and at least one hinge module accommodated by each hinge hole so as to rotatably connect the double hinge arm respectively to the first and second housings.

In accordance with another aspect of the present invention, there is provided a hinge device of a portable wireless terminal with a first housing and a second housing that is rotatably connected to the first housing. The hinge device comprises a double hinge arm which includes a first hinge arm extending in the longitudinal direction of the first housing and being rotatably connected to the first housing, a second hinge arm being parallelly or substantially parallelly connected to the first hinge arm, extending in the longitudinal direction of the second housing and being rotatably connected to the second housing, and hinge holes respectively installed on one ends of the first and second hinge arms. The hinge device further includes a first hinge module accommodated by the hinge hole of the first hinge arm so as to rotatably connect the double hinge arm to the first housing, and a second hinge module accommodated by the hinge hole of the second hinge arm so as to rotatably connect the double hinge arm to the second housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein have been omitted for conciseness.

Figure 1:
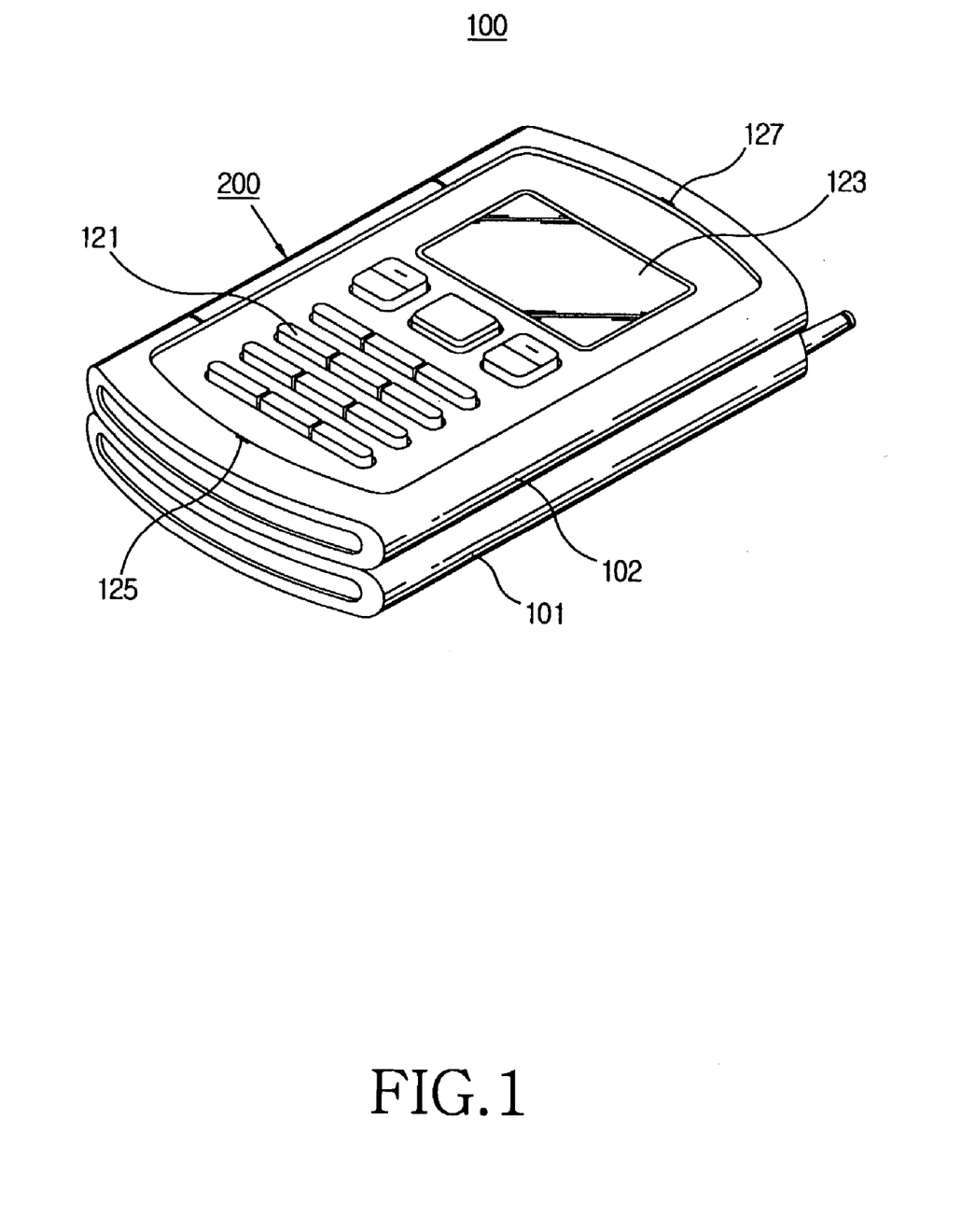
FIG. 1 is a perspective view of an example of a portable wireless terminal employing a hinge device in accordance with an embodiment of the present invention.
Figure 2:
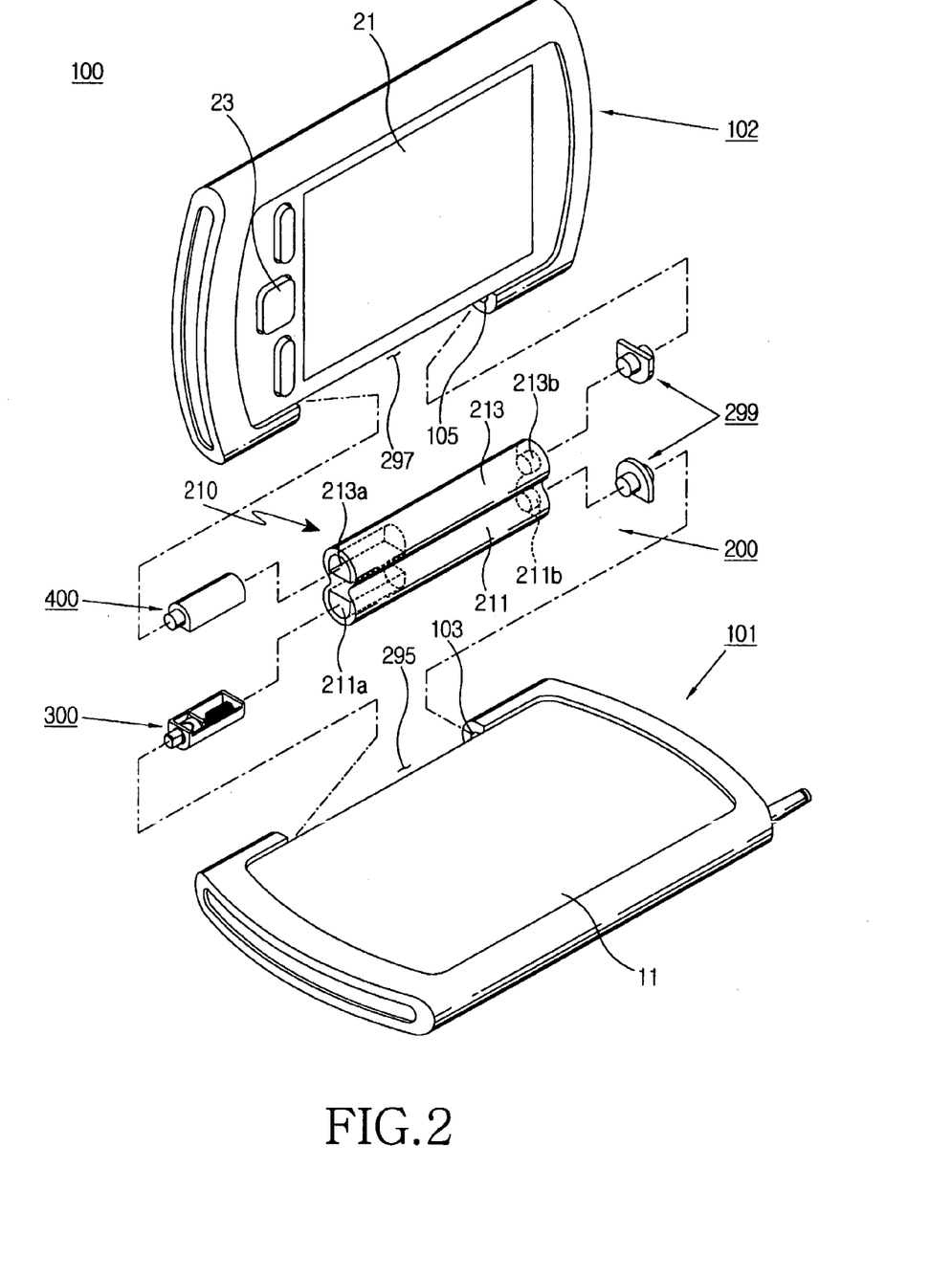
FIG. 2 is an exploded perspective view of the portable wireless terminal of FIG. 1.

FIG. 1 is a perspective view of an example of a portable wireless terminal 100 employing a hinge device 200 in accordance with an embodiment of the present invention, and FIG. 2 is an exploded perspective view of the portable wireless terminal 100 of FIG. 1. As shown in FIGS. 1 and 2, the portable wireless terminal 100 in accordance with an embodiment of the present invention comprises a first housing 101, a second housing 102, and the hinge device 200 for rotatably connecting the first housing 101 to the second housing 102.

As shown in FIG. 1, when the second housing 102 is substantially overlapped on the first housing 101 so as to expose its front surface to the outside, the portable wireless terminal 100 is operating in a communications mode.

A keypad 121, a first display device 123, a transmitting unit 125 (including a microphone installed therein), and a receiving unit 127 (including a speaker installed therein) are provided on the front surface of the second housing 102. The keypad 121 is used to recall various menus and information in order to communicate with a user, and transmit and receive data. The first display device 123 is used to display various information required in the communication mode such as transmitting and receiving states and a terminal state.

Referring to FIG. 2, a second display device 21 (used in a PDA mode) and function keys 23 for the PDA mode are provided on the rear surface of the second housing 102. When the second housing 102 is opened from the first housing 101, the portable wireless terminal 100 is used as an information terminal with the functions of a PDA instead of the functions of a portable terminal. The second display device 21 can be a touch screen.

A keyboard 11 used to input data in the PDA mode is provided on the front surface of the first housing 101, which is opposite to the rear surface of the second housing 102. It can be appreciated to those skilled in the art that the keyboard 11 of FIG. 2 can be of several different types, including, but not limited to, a press-type keyboard. The press-type keyboard is mechanically operated, and generally used in personal computers. Another type of keyboard that can be used is a touch screen-type keyboard. When a touch screen is installed on the first housing 101 as the data input means, the touch screen can also be used as the display device, thereby extending the functions of the terminal 100.

The hinge device 200 is installed on the side surface of the terminal 100. However, the hinge device 200 can also be installed on the top or bottom surface of the terminal 100.

The hinge device 200 includes a double hinge arm 210, a pair of hinge modules 300 and 400, and a pair of hinge dummies 299.

The double hinge arm 210 includes a first hinge arm 211 rotatably connected to the first hinge housing 101, and a second hinge arm 213 formed integrally with the first hinge arm 211, and rotatably connected to the second hinge housing 102. The first hinge arm 211 and second hinge arm 213 being parallelly or substantially parallelly connected to each other. The double hinge arm 210 can therefore be rotated about the first and second housings 101 and 102. Openings 295 and 297 for accommodating the double hinge arm 210 are respectively formed on the first side surfaces of the first and second housings 101 and 102. Each of the openings 295 and 297 is shaped to enable engagement with the first hinge arm 211 or the second hinge arm 213. Therefore, when the first and second hinge arms 211 and 213 are respectively connected to the openings 295 and 297, the outer circumference of the double hinge arm 210 is engaged with the outer surface of the first or second housing 101 or 102. The double hinge arm 210 is rotated at or about 180° about the first and second housings 101 and 102. A pair of hinge holes 211a and 213a are formed on a first end of the double hinge arm 210. The hinge holes 211a and 213a are respectively formed on the first and second hinge arms 211 and 213 of the double hinge arm 210.

Figure 3:
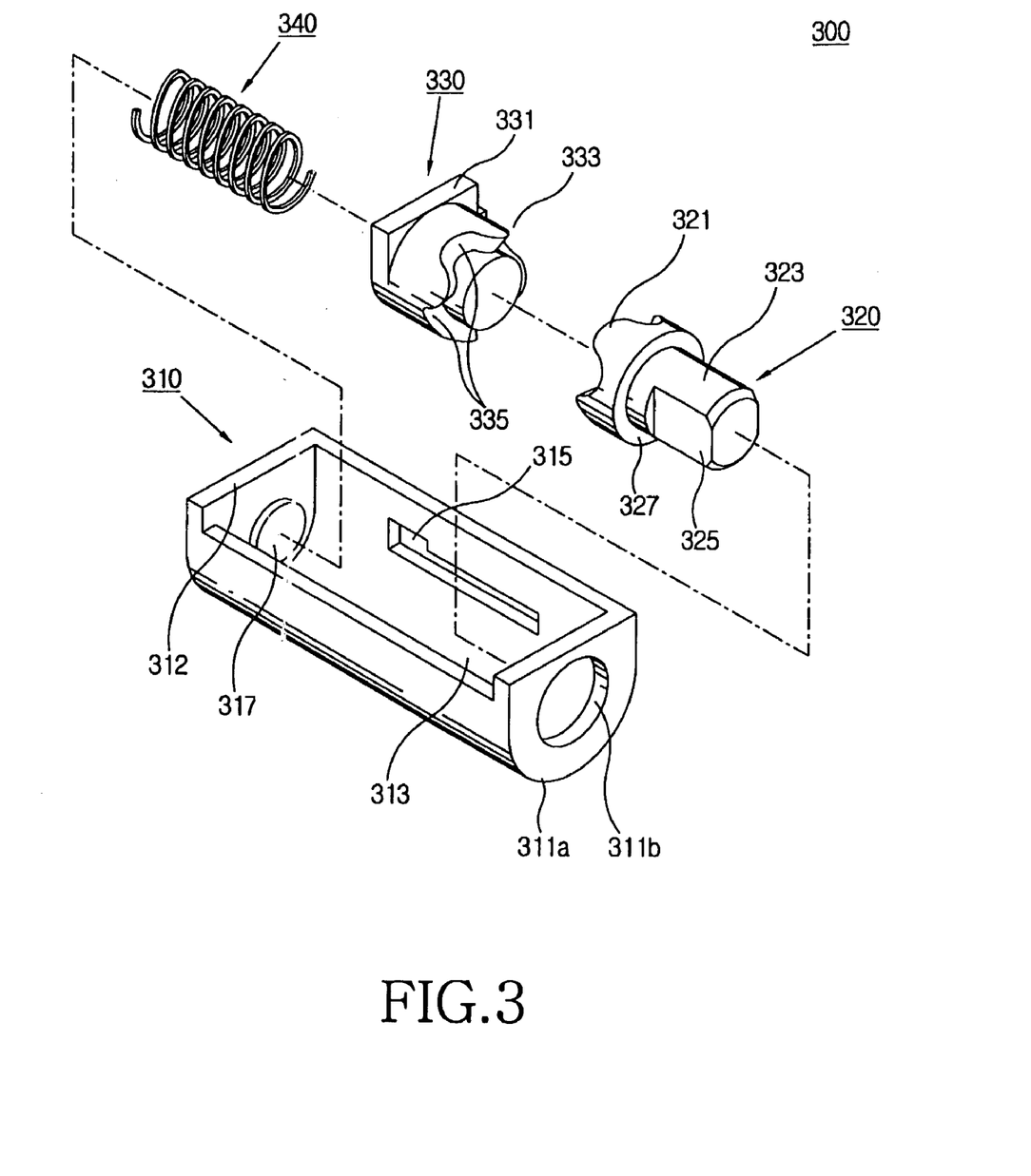
FIG. 3 is an exploded perspective view of a first hinge module of FIG. 2.
Figure 4:
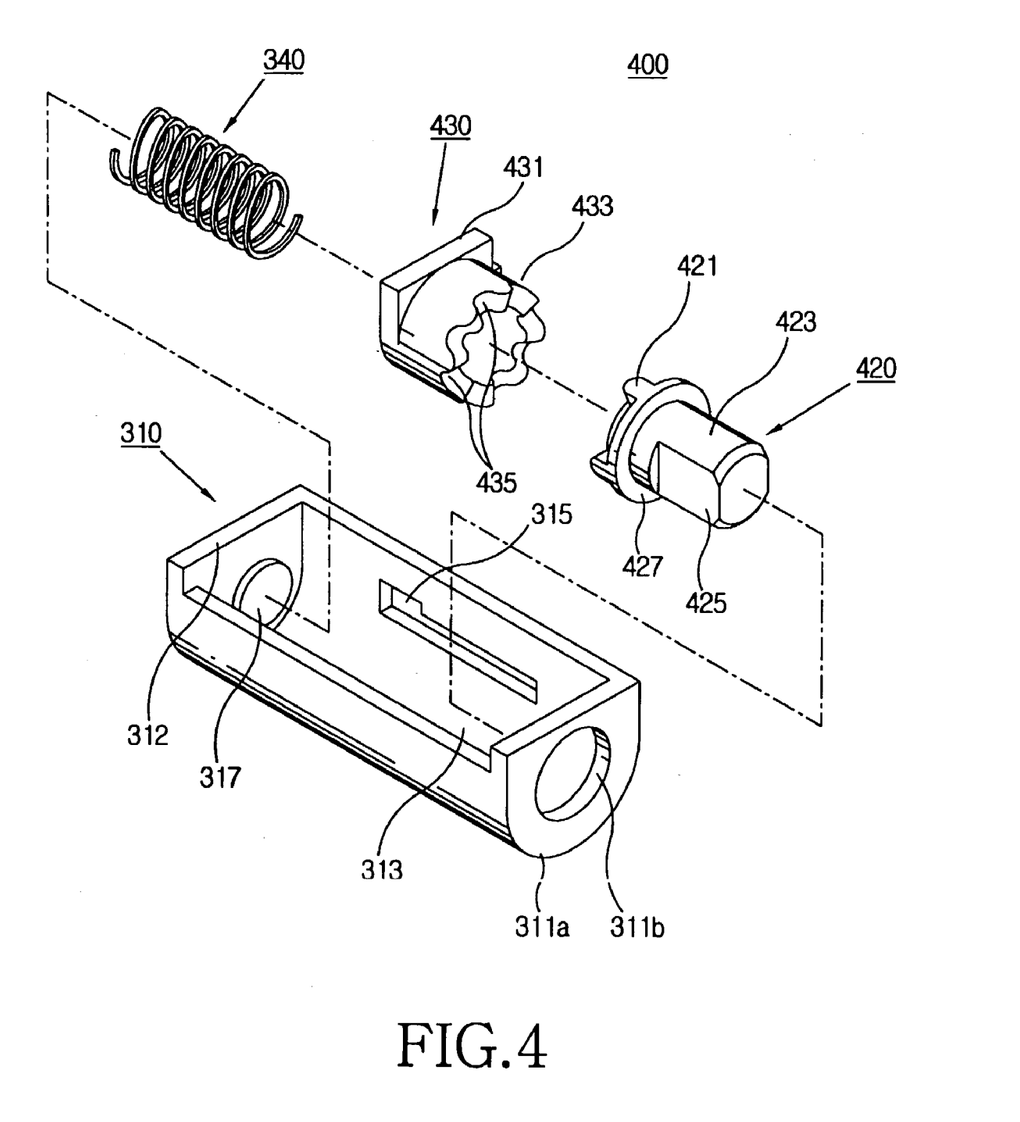
FIG. 4 is an exploded perspective view of a second hinge module of FIG. 2.
Figure 5:
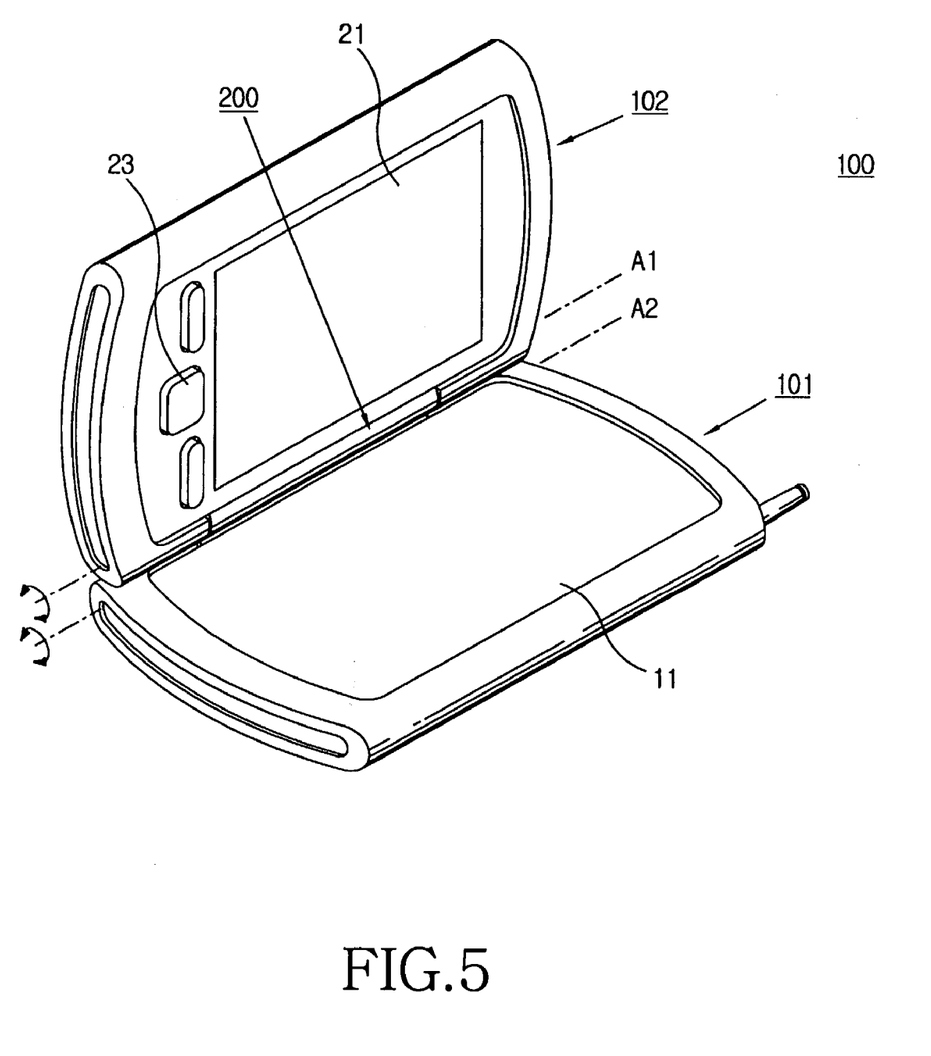
FIGS. 5 through 9 are perspective views showing examples of an opening and closing action of the portable wireless terminal of FIG. 1.

Rotary axes A1 and A2 shown in FIG. 5 of the double hinge arm 210 are respectively connected to the first and second housings 101 and 102 by a pair of the hinge modules 300 and 400, and a pair of the hinge dummies 299. The pair of the hinge modules 300 and 400 consist of the first hinge module 300, shown in FIG. 3, and the second hinge module 400, shown in FIG. 4. The hinge modules 300 and 400 are parallelly or substantially parallelly installed in the first and second housings 101 and 102 respectively. As shown in FIGS. 3 and 4, the hinge modules 300 and 400 respectively include a hinge housing 310, hinge shafts 320 and 420, hinge cams 330 and 430, and a hinge spring 340. The first hinge module 300 differs from the second hinge module 400 in the shapes of the hinge shafts 320 and 420 and the hinge cams 330 and 430.

The first and second hinge modules 300 and 400 will now be discussed in detail with reference to FIGS. 3 and 4. One end of the hinge housing 310 is a closed end 312, and the other end of the hinge housing 310 is an opened end 311a with a through hole 311b formed thereon. A receiving cavity 313 is provided on the hinge housing 310 which is opened at a first side surface of the hinge housing 310. A guide groove 315 with a designated length is formed on the inner wall of the hinge housing 310. A projection 317 projects from the inner surface of closed end 312. The hinge housing 310 is inserted into the hinge hole 211a or 213a of the double hinge arm 210. The hinge shaft 320 or 420, the hinge cam 330 or 430, and the hinge spring 340 are successively accommodated within the receiving cavity 313.

The hinge shafts 320 and 420 respectively include mountain-shaped portions 321 and 421 with a curved surface provided on one ends of the hinge shafts 320 and 420, and hinge protrusions 323 and 423 protruding from the opened end 311a of the hinge housing 310 via the through hole 311b and provided on the other ends of the hinge shafts 320 and 420. Stepped surfaces 327 and 427 are respectively formed on one ends of the hinge protrusions 323 and 423 so as to be supported by the inner wall of the hinge housing 310. The hinge shafts 320 and 420 are rotated within the hinge housing 310 and then respectively fixedly connected to the first and second housings 101 and 102 of the terminal 100. The hinge protrusions 323 and 423 protrude from the outer surface of the hinge housing 310 and are respectively connected to the first and second housings 101 and 102. Planes 325 and 425 are respectively formed on the outer circumferences of the other ends of the hinge protrusions 323 and 423 so as to be fixedly connected to the first and second housings 101 and 102. Preferably, the mountain-shaped portions 321 and 421 are formed to be radially symmetrical.

A plurality of valley-shaped portions 335 and 435 are respectively formed on the first ends of bodies 331 and 431 of the hinge cams 330 and 430, so as to be engaged with the mountain-shaped portions 335 and 435 of the hinge shafts 320 and 420. Thereby, the hinge cams 330 and 430 and the hinge shafts 320 and 420 are accommodated within the hinge housing 310 so that the mountain-shaped portions 321 and 421 are in a sliding contact with the corresponding valley-shaped portions 335 and 435. Preferably, the valley-shaped portions 335 and 435 are radially symmetrical. Guide protrusions 333 and 433 are respectively formed on the outer circumference of the bodies 331 and 431 of the hinge cams 330 and 430 so as to be inserted into the guide groove 315 of the hinge housing 310. Therefore, the hinge cams 330 and 430 perform a rectilinearly reciprocating motion within the hinge housing 310.

Compared to the second hinge module 400, the hinge shaft 320 and the hinge cam 330 of the first hinge module 300 differ from the hinge shaft 420 and the hinge cam 430 of the second hinge module 400 in the number of the mountain-shaped portions 321 and 421, and the valley-shaped portions 335 and 435.

The first hinge module 300 shown in FIG. 3 includes a pair of the mountain-shaped portions 321, and two pairs of the valley-shaped portions 335. The mountain-shaped portions 321 are spaced from each other at or about 180° intervals, and the valley-shaped portions 335 are spaced from each other at or about 90° intervals. The hinge shaft 320 of the first hinge module 300 stops its rotation at or about 90° intervals. Therefore, the double hinge arm 210 stops its rotation against the first housing 101 at or about 90° intervals.

The second hinge module 400 shown in FIG. 4 includes two pairs of the mountain-shaped portions 421, and four pairs of the valley-shaped portions 435. The mountain-shaped portions 421 are spaced from each other at or about 90° intervals, and the valley-shaped portions 435 are spaced from each other at or about 45° intervals. The hinge shaft 420 of the first hinge module 400 stops its rotation at or about 45° intervals. Therefore, the double hinge arm 210 stops its rotation against the second housing 102 at or about 45° intervals.

One end of the hinge spring 340 is supported by the inner wall of the closed end 312 of the hinge housing 310, and the other end of the hinge spring 340 supports the hinge cam 330 or 430. Therefore, the hinge cams 330 and 430 are pressed by an elastic force supplied from the hinge spring 340 in a direction such that the mountain-shaped portions 321 and 421 of the hinge shafts 320 and 420 are closely engaged with the valley-shaped portions 335 and 435 of the hinge cams 330 and 430. Preferably, a compressively coiled spring is used as the hinge spring 340.

The hinge dummies 299 (see FIG. 2) are respectively installed on the openings 295 and 297 of the first and second housings 101 and 102, thereby supporting the rotary axes A1 and A2 of the double hinge arm 210. Therefore, fixing holes 103 and 105 for receiving the hinge dummies 299 are respectively formed on the first end of the openings 295 and 297 of the first and second housing 101 and 102, and supporting holes 211b and 213b are respectively formed on the other end of the double hinge arm 210. The hinge dummies 299 are respectively fixed to the fixing holes 103 and 105 of the openings 295 and 297 of the first and second housings 101 and 102, and rotatably inserted into the supporting holes 211b and 213b of the first and second hinge arms 211 and 213 respectively, thereby supporting the rotary axes A1 and A2 of the double hinge arm 210.

The rotary axes A1 and A2 including the first and second hinge modules 300 and 400, and a pair of the hinge dummies 299 are respectively located on the first side of the first and second housings 101 and 102.

Figure 6:
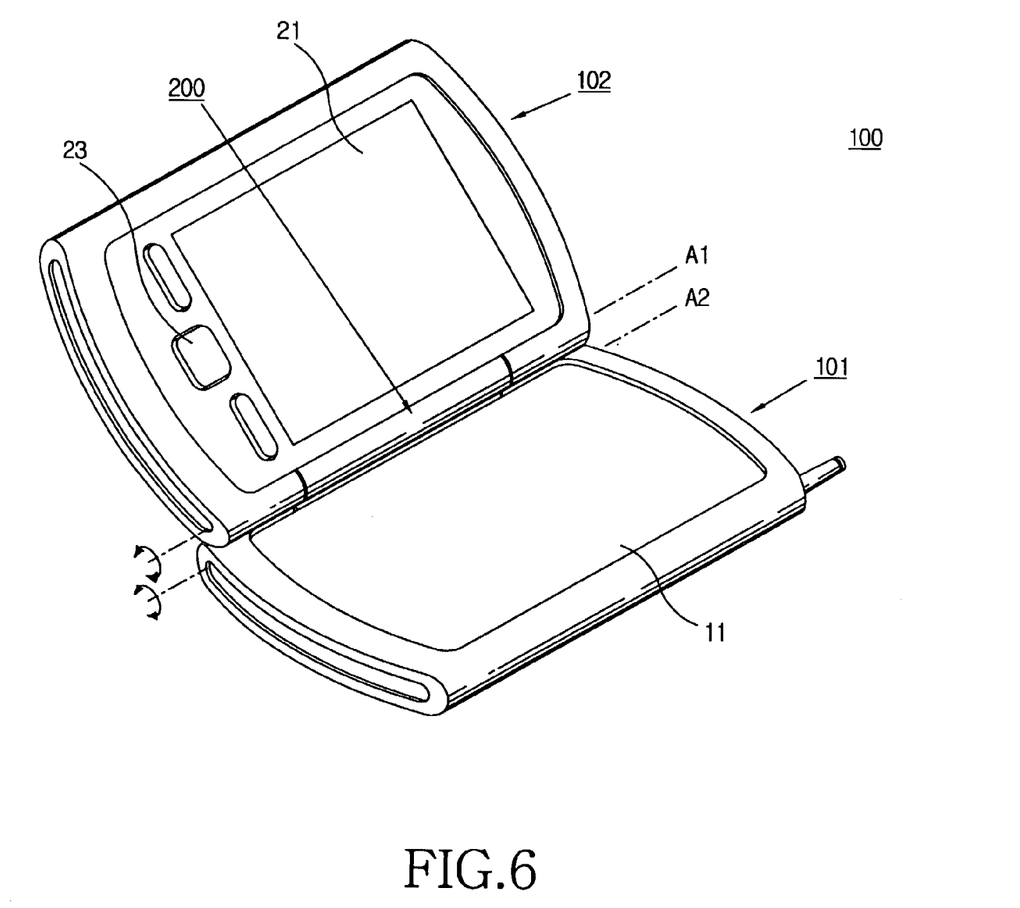
Figure 7:
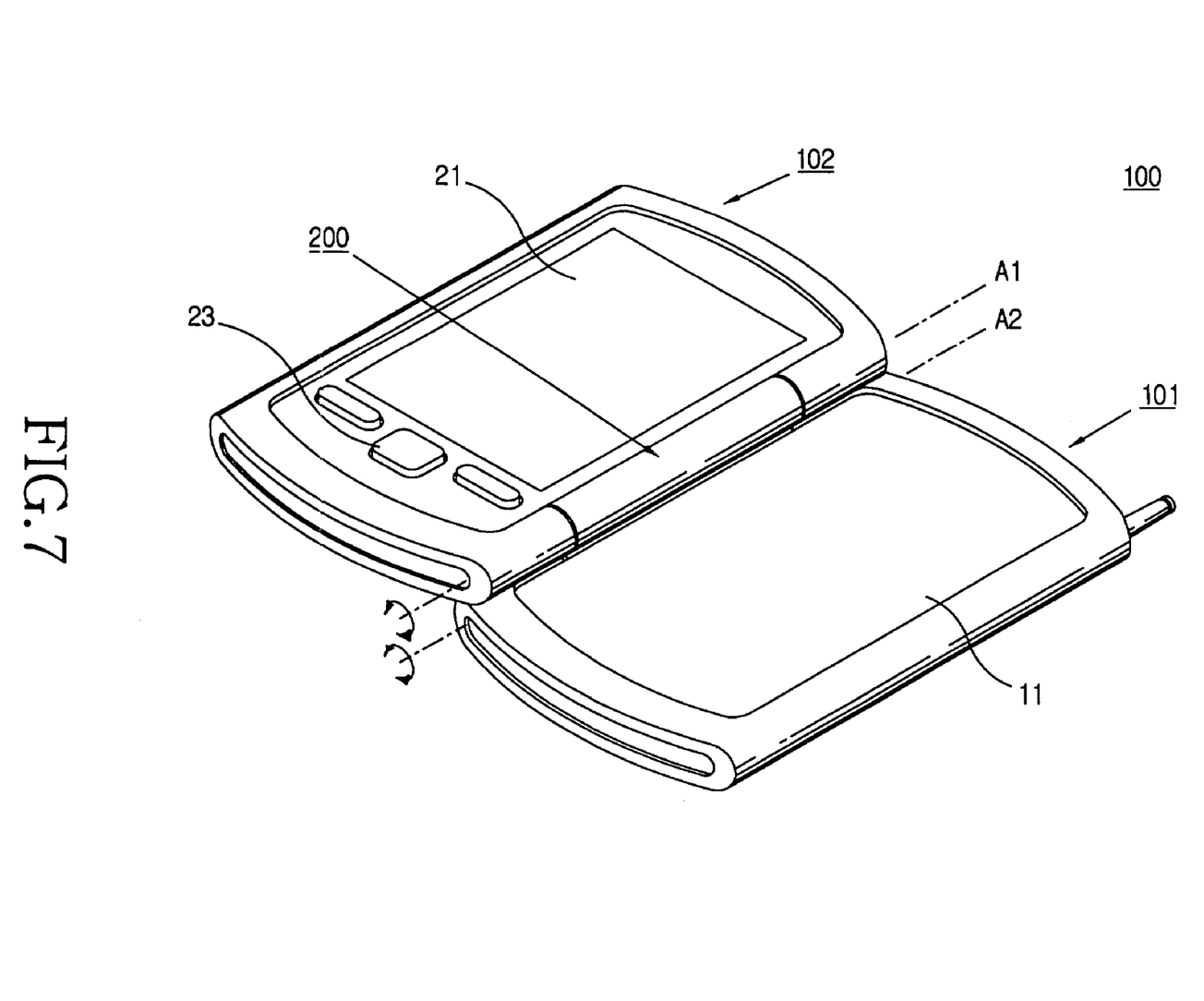
Figure 8:
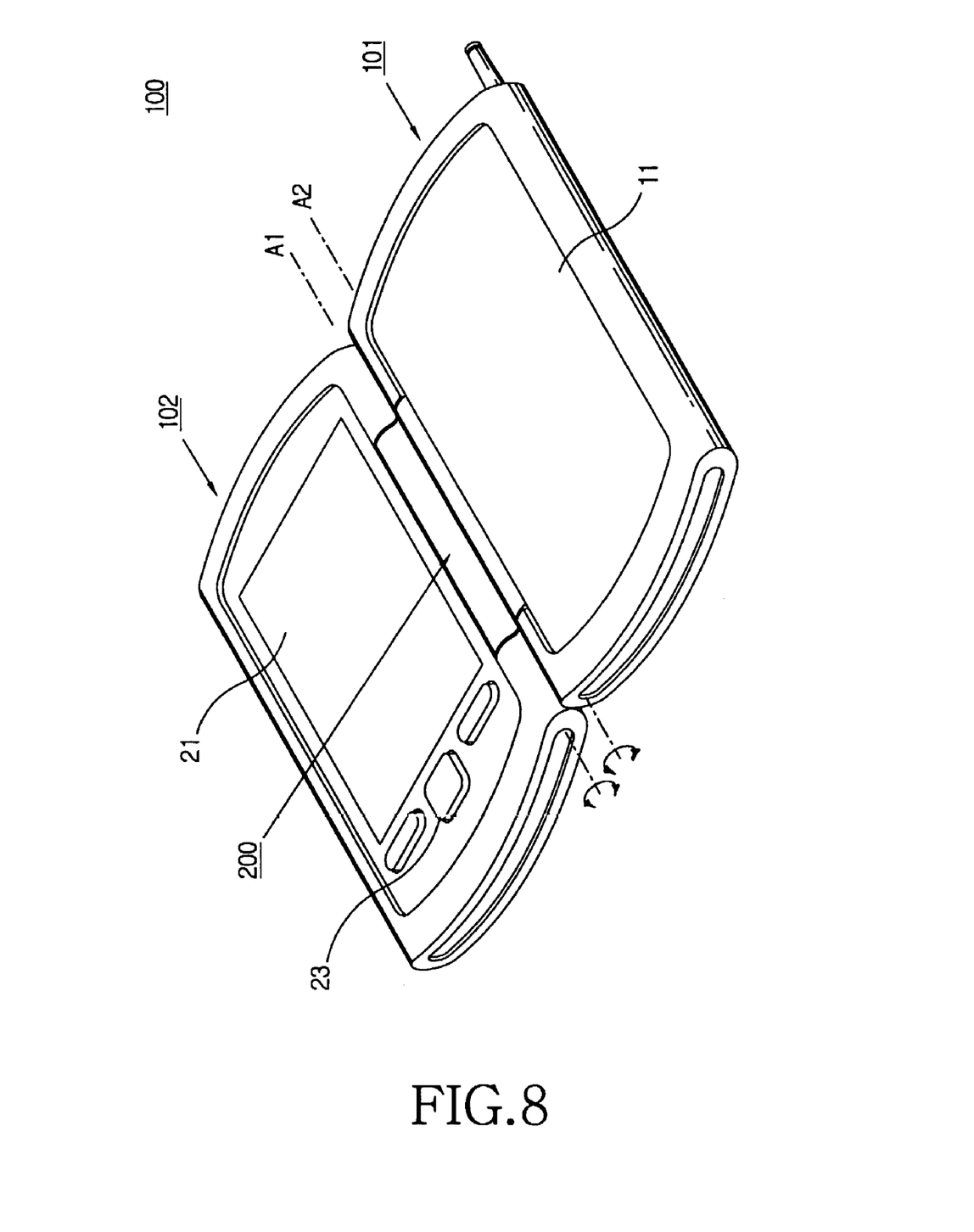

FIGS. 5 through 9 illustrate an example of an opening and closing action of the portable wireless terminal 100 shown in FIG. 1. As described above, the double hinge arm 210 stops its rotation at or about 90° or 45° intervals by the operation of the first or second hinge module 300 or 400. FIGS. 5 to 7 respectively show the portable wireless terminals 100 in opened states by rotating the second housing 102 at or about 90°, 135°, and 180° against the first housing 101 by the operation of the second hinge module 400. FIG. 8 shows the portable wireless terminal 100 in a substantially fully opened state by simultaneously rotating the first hinge module 300, at or about 90°, and rotating the second hinge module 400 at or about 90° also, so that the first housing 101 is substantially coplanar with the second housings 102. As shown in FIGS. 5 to 8, when the second housing 102 is opened from the first housing 101 at or about 90°, 135°, or 180°, a user can conveniently input data via the input means such as the keyboard 11 provided on the first housing 101.

Figure 9:
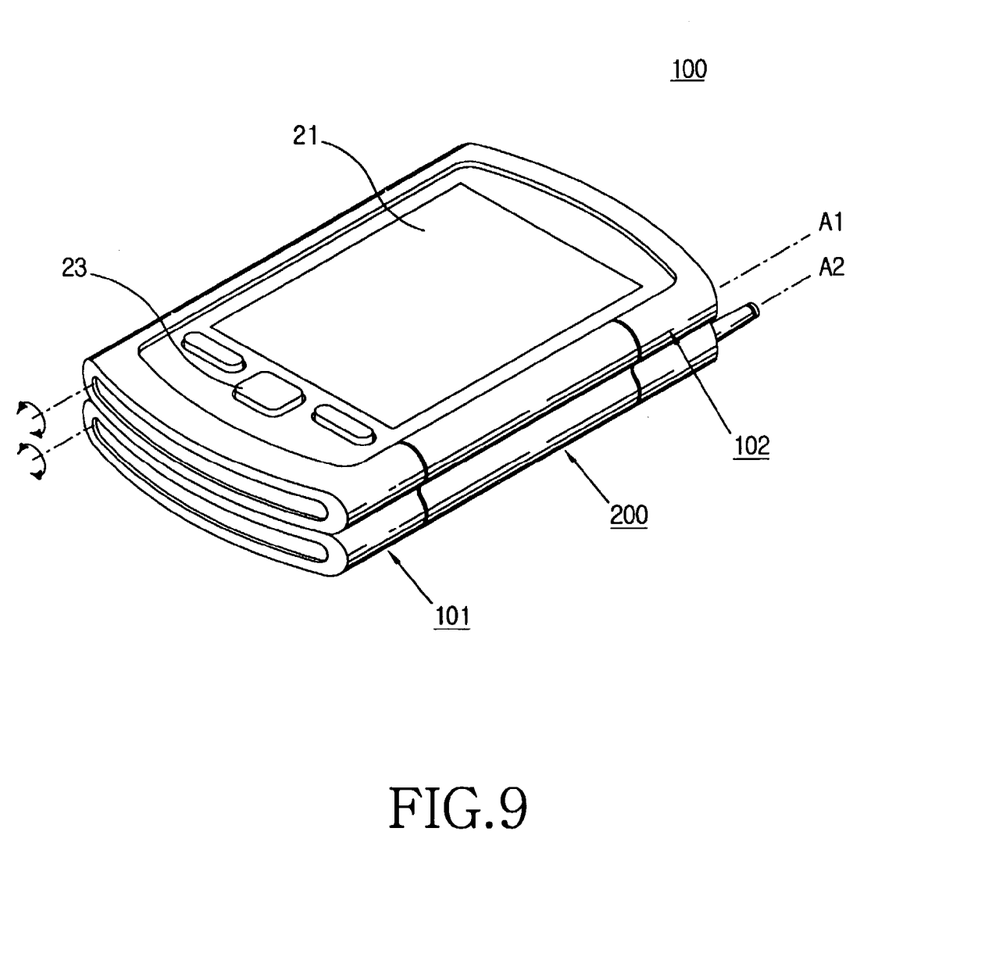

FIG. 9 shows the portable wireless terminal 100 in which the first and second hinge modules 300 and 400 are respectively rotated at or about 180°.The second housing 102 is therefore rotated from the first housing 101 at or about 360°, and the rear surface of the second housing 102 is substantially overlapped on the rear surface of the first housing 101. Comparison of the portable wireless terminal 100 shown in FIGS. 1 (in which the portable wireless terminal 100 is in the communication mode) and 9 (in which the portable wireless terminal 100 is in the PDA mode) illustrates the differences in the configurations. In the PDA mode, where the rear surface of the second housing 102 is substantially overlapped on the rear surface of the first housing 101, a user can conveniently use the portable wireless terminal 100 while walking.

In order to stop the rotation of the second housing 102 at or about 45° intervals, at least one hinge module of the first and second hinge modules 300 and 400 must also stop its rotation at or about 45° intervals.

The second housing 102 is constructed so that the rotation of the second housing 102 is stopped at various angles according to the angle intervals where the valley-shaped portions 335 and 435 of the hinge cams 330 and 430 are respectively spaced from each other. For example, in case that the valley-shaped portions 335 and 435 are spaced from each other at or about 30° or 15° intervals, the second housing 102 stops its rotation at the corresponding location.

As apparent from the above description, the present invention provides a hinge device for a portable wireless terminal comprising a pair of housings respectively with rotary axes, thereby allowing one housing to be rotated from the other housing at or about 360°. Therefore, the portable wireless terminal employing the hinge device of the present invention accommodates various units such as a display device, an inputting unit, and so on, and the functions of the terminal are easily modified and extended in various ways. Further, various information terminals are easily integrated as one portable wireless terminal. Moreover, since a user can open or close the terminal at various angles according to circumferences, the portable wireless terminal of the present invention is conveniently used.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A hinge device of a portable wireless terminal with a first housing and a second housing being rotatably connected to the first housing, comprising:
   a double hinge arm having a first hinge arm and second hinge arm extending in the longitudinal direction of the first and second housings, said first hinge arm being rotatably connected to the first housing and the second hinge arm being rotatably connected to the second housing;
   a hinge hole formed in a first end of each of said first and second hinge arms of the double hinge arm;
   at least one hinge module accommodated by each hinge hole so as to rotatably connect the respective hinge arm of the double hinge arm to the first and second housings, said at least one hinge module being rotatably fixed in the respective hinge hole with respect to the double hinge arm;
   openings respectively formed on one side of each of the first and second housings so as to accommodate a respective hinge arm of the double hinge arm, each opening having a first end and a second end;
   fixing holes respectively formed in said first ends of the first and second openings;
   supporting holes respectively formed in second ends of the first and second hinge arms; and
   hinge dummies respectively fixed to the fixing holes and inserted into the supporting holes of the first and second hinge arms so as to support the rotation of the double hinge arm.

2. The hinge device of a portable wireless terminal as set forth in claim 1, wherein the hinge module includes:
   a hinge housing being accommodated by the hinge hole, and having a guide groove formed on the inner wall of its one side so as to extend in a longitudinal direction, and a through hole formed through its one end;
   a hinge cam being accommodated by the hinge housing, and having a guide protrusion formed on its outer circumference so as to correspond to the guide groove and perform a rectilinear motion along the longitudinal direction within the hinge housing, and a plurality of valley-shaped portions formed on its one end;
   a hinge shaft being accommodated by the hinge housing, and having at least two mountain-shaped portions formed on its one end so as to correspond to the valley-shaped portions of the hinge cam, and a hinge protrusion extending from its other end so as to be protruded to the outside via the through hole of the hinge housing, thereby rotating about a rotary axis extending in the longitudinal direction of the double hinge arm; and
   a hinge spring interposed between the inner wall of the other end of the hinge housing and the hinge cam so as to supply an elastic force in a direction such that the valley-shaped portions of the hinge cam are closely engaged with the mountain-shaped portions of the hinge shaft.

3. The hinge device of a portable wireless terminal as set forth in claim 2, wherein in the case of at least one hinge module, the valley-shaped portions are spaced from each other by about 45° and the hinge shaft stops its rotation at about 45° intervals.

4. The hinge device of a portable wireless terminal as set forth in claim 2, wherein in one hinge module selected from the hinge modules, the valley-shaped portions are spaced from each other by about 90° and the hinge shaft stops its rotation at about 90° intervals.

5. The hinge device of claim 2, wherein each of said hinge shafts is rotatably fixed to a respective housing.

6. The hinge device of a portable wireless terminal as set forth in claim 1, wherein the double hinge arm is rotated respectively from the first and second housings in the range of about 180°.

7. The hinge device of a portable wireless terminal as set forth in claim 1, wherein the hinge modules are substantially parallelly installed on the double hinge arm.

8. The hinge device of claim 1, wherein each of said hinge modules include a hinge housing and a hinge shaft, said hinge shaft being rotatable with respect to said hinge housing and rotatably fixed to a respective housing.

9. A hinge device of a portable wireless terminal with a first housing and a second housing being rotatably connected to the first housing, comprising:
   a double hinge arm including:
     a first hinge arm extending in the longitudinal direction of the first housing and being rotatably connected to the first housing;
     a second hinge arm being substantially parallelly connected to the first hinge arm, extending in the longitudinal direction of the second housing and being rotatably connected to the second housing; and
     hinge holes respectively formed in a first end of each of the first and second hinge arms;
   a first hinge module accommodated by the hinge hole of the first hinge arm so as to rotatably connect the double hinge arm to the first housing, said first hinge module being rotatably fixed with respect to said first hinge arm;
   a second hinge module accommodated by the hinge hole of the second hinge arm so as to rotatably connect the double hinge arm to the second housing, said second hinge module being rotatably fixed with respect to said second hinge arm;

openings respectively formed on one side of each of the first and second housings so as to accommodate the first hinge arm and the second hinge arm of the double hinge arm, respectively, each opening having a first end and a second end;

fixing holes respectively formed in said first ends of the first and second openings;

supporting holes respectively formed in second ends of the first and second hinge arms; and hinge dummies respectively fixed to the fixing holes and inserted into the supporting holes of the first and second hinge arms so as to support the rotation of the double hinge arm.

10. The hinge device of a portable wireless terminal as set forth in claim 9, wherein the first hinge module includes:

a first hinge housing being accommodated by the hinge hole of the first hinge arm, and having a guide groove formed on the inner wall of its one side so as to extend in a longitudinal direction and a through hole formed through its one end;

a first hinge cam being accommodated by the first hinge housing, and having a guide protrusion formed on its outer circumference so as to correspond to the guide groove of the first hinge housing and perform a rectilinear motion along the longitudinal direction within the first hinge housing and a plurality of valley-shaped portions formed on its one end;

a first hinge shaft being accommodated by the first hinge housing, and having at least two mountain-shaped portions formed on its one end so as to correspond to the valley-shaped portions of the first hinge cam and a hinge protrusion extending from its other end so as to be protruded to the outside via the through hole of the first hinge housing, thereby rotating about a rotary axis extending in the longitudinal direction of the double hinge arm; and a first hinge spring interposed between the inner wall of the other end of the first hinge housing and the first hinge cam so as to supply an elastic force in a direction such that the valley-shaped portions of the first hinge cam are closely engaged with the mountain-shaped portions of the first hinge shaft.

11. The hinge device of claim 10, wherein said first hinge shaft is rotatably fixed to the first housing, and said second hinge shaft is rotatably fixed to the second housing.

12. The hinge device of a portable wireless terminal as set forth in claim 10, wherein the valley-shaped portions of the first hinge cam are spaced from each other by about 90° and the first hinge shaft stops its rotation at about 90° intervals.

13. The hinge device of a portable wireless terminal as set forth in claim 10, wherein the valley-shaped portions of the first hinge cam are spaced from each other by about 45° and the first hinge shaft stops its rotation at about 45° intervals.

14. The hinge device of a portable wireless terminal as set forth in claim 9, wherein the second hinge module includes:

a second hinge housing being accommodated by the hinge hole of the second hinge arm, and having a guide groove formed on the inner wall of its one side so as to extend in a longitudinal direction and a through hole formed through its one end;

a second hinge cam being accommodated by the second hinge housing, and having a guide protrusion formed on its outer circumference so as to correspond to the guide groove of the second hinge housing and perform a rectilinear motion along the longitudinal direction within the second hinge housing and a plurality of valley-shaped portions formed on its one end;

a second hinge shaft being accommodated by the second hinge housing, and having at least two mountain-shaped portions formed on its one end so as to correspond to the valley-shaped portions of the second hinge cam and a hinge protrusion extending from its the other end so as to be protruded to the outside via the through hole of the second hinge housing, thereby rotating about a rotary axis extending in the longitudinal direction of the double hinge arm; and a second hinge spring interposed between the inner wall of the other end of the second hinge housing and the second hinge cam so as to supply an elastic force in a direction such that the valley-shaped portions of the second hinge cam are closely engaged with the mountain-shaped portions of the second hinge shaft.

15. The hinge device of a portable wireless terminal as set forth in claim 14, wherein the valley-shaped portions of the second hinge cam are spaced from each other by about 90° and the second hinge shaft stops its rotation at about 90° intervals.

16. The hinge device of a portable wireless terminal as set forth in claim 14, wherein the valley-shaped portions of the second hinge cam are spaced from each other by about 45° and the second hinge shaft stops its rotation at about 45° intervals.

17. The hinge device of claim 9, wherein said first hinge module includes a first hinge housing received in the hinge hole of the first hinge arm, and a first hinge shaft being rotatable with respect to the first hinge housing and being rotatably fixed to the first housing; and said second hinge module includes a second hinge housing received in the hinge hole of the second hinge arm, and a second hinge shaft being rotatable with respect to the second hinge housing and being rotatably fixed to the second housing.

18. A hinge device of a portable wireless terminal, the terminal having a first housing having first and second ends and a second housing having first and second ends and being rotatably connected to the first housing by the hinge device, the hinge device comprising:

a double hinge arm including:

a first hinge arm with first and second ends and extending in a longitudinal direction of the first housing and said first end having a hole therein;

a first hinge dummy having a first end rotatably fixed in said hole in said first end of said first hinge arm, and a second end rotatably coupled to said first end of said first housing;

a second hinge arm with first and second ends and being substantially parallel and connected to the first hinge arm, and extending in a longitudinal direction of the second housing and said first end having a hole therein, the first hinge arm and the second arm being fixed to each other;

a second hinge dummy having a first end rotatably fixed in said hole in said first end of said second hinge arm, and a second end rotatably coupled to said first end of said second housing;

each of the first and second hinge arms having a hinge hole formed in each second end;

a first hinge module having a first end received in and rotatably fixed in the hinge hole of the first hinge arm and a second end being rotatably connected to the first housing; and a second hinge module having a first end received in and rotatably fixed to the hinge hole of the second hinge arm and a second end being rotatably connected to the second housing.

19. The hinge device of claim 18, wherein the first and second housings each have a recess in a side, the first and second ends of the first housing being formed in the recess of the first housing and the first and second ends of the second housing being formed in the recess of the second housing;

the first end of the first hinge arm being rotatably connected to the first end of the recess and the second end of the first hinge module being rotatably connected to the second end of the first recess of the first housing; and the first end of the second hinge arm being rotatably connected to the first end of the recess and the second end of the second hinge module being rotatably connected to the second end of the second recess of the second housing.

20. The hinge device of claim 18, wherein the second end of the first hinge module includes an axially extending pin with a first end that is rotatable with respect to the first hinge module and a second end coupled to and rotatably fixed with respect to the second end of the recess of the first housing; and the second end of the second hinge module includes an axially extending pin with a first end that is rotatable with respect to the second hinge module and a second end coupled to and rotatably fixed with respect to the second end of the recess of the second housing.

* * * * *